(12) United States Patent
Ishiba

(10) Patent No.: US 8,177,527 B2
(45) Date of Patent: May 15, 2012

(54) FAN DRIVEN BY TIP TURBINE

(75) Inventor: Masatsugu Ishiba, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 771 days.

(21) Appl. No.: 12/068,378

(22) Filed: Feb. 6, 2008

(65) Prior Publication Data

US 2009/0068033 A1 Mar. 12, 2009

(30) Foreign Application Priority Data

Feb. 6, 2007 (JP) .............................. P2007-027084

(51) Int. Cl.
*F04B 17/02* (2006.01)
*F04D 29/44* (2006.01)

(52) U.S. Cl. ..................................... 417/408; 415/199.4

(58) Field of Classification Search .................. 417/408, 417/409; 415/79, 199.1; 60/39.43, 39.162, 60/268

See application file for complete search history.

(56) References Cited

U.S. PATENT DOCUMENTS

| | | | | |
|---|---|---|---|---|
| 2,428,330 A | * | 9/1947 | Heppner | 417/247 |
| 2,940,689 A | * | 6/1960 | Howell | 244/12.3 |
| 3,335,976 A | * | 8/1967 | Kappus | 244/12.3 |
| 3,719,426 A | * | 3/1973 | Friberg et al. | 415/116 |
| 3,904,324 A | * | 9/1975 | Flatt et al. | 417/355 |
| 4,573,870 A | * | 3/1986 | Moussa | 415/202 |
| 6,783,321 B2 | * | 8/2004 | Lathrop et al. | 415/100 |

FOREIGN PATENT DOCUMENTS

| | | |
|---|---|---|
| JP | 39-2024 | 2/1939 |
| JP | 48-93095 | 3/1972 |
| JP | 2003-293702 | 10/2003 |
| JP | 2006056364 A * | 3/2006 |
| JP | 2006-138206 | 6/2006 |
| WO | WO 2006059990 A1 * | 6/2006 |

OTHER PUBLICATIONS

Japanese Office Action dated Jan. 27, 2009.
Iwase, S. et al., "Unsteady Flow inside the Single Rotor Blade Row with Multistage Tip Turbine ($2^{nd}$ Report: Effects of bulkheads positioning on efficiency)," *Gas Turbine Soc. Japan*, Mar. 2006, vol. 34, No. 2, pp. 36-41.
Iwase, S., et al., "The Fan Driven by High Pressure Tip Turbine," *Gas Turbine Soc. Japan*, Jan. 2005, vol. 33, No. 1, pp. 44-51.
Japanese Office Action dated Apr. 7, 2009.

* cited by examiner

*Primary Examiner* — Charles Freay
(74) *Attorney, Agent, or Firm* — Finnegan, Henderson, Farabow, Garrett & Dunner, LLP

(57) ABSTRACT

At the time of an operation, high-pressure air 8 fed through an inlet 6 passes a stator vane 4 within a duct 15, so as to adjust its flow, and is supplied to a tip turbine rotor vane 3. The tip turbine rotor vane 3 is supplied with the high-pressure air 8 from the exhaust side 17 toward the intake side 16, so as to drive an upper fan 2 and a lower fan 14 to rotate in the same direction. This can shorten the distance H from a rotation surface 12 of the upper fan 2 to the end part of a fan casing 1 on the intake side 16, and thus reduce an area where a negative pressure occurs when receiving a crosswind 9, thereby lowering an external force 11 caused by the negative pressure.

3 Claims, 8 Drawing Sheets

FAN DRIVEN BY TIP TURBINE

BACKGROUND OF THE INVENTION

1. Field of the Invention

The present invention relates to a fan driven by a tip turbine and, in particular, to one which drives a fan to rotate by supplying a fluid to a tip turbine rotor cascade provided at the outer periphery of the fan.

2. Related Background Art

It has conventionally been proposed to employ a fan driven by a tip turbine, which drives a fan to rotate by supplying a fluid to a tip turbine rotor cascade provided at the outer periphery of the fan, in VTOL (Vertical Take-Off and Landing) aircrafts. For example, Japanese Patent Application Laid-Open No. 2003-293702 discloses a structure which supplies a working fluid to a tip turbine rotor cascade through a supply duct from the intake side toward the exhaust side of the fan, returns the working fluid having passed the tip turbine rotor cascade toward the intake side of the fan through a return duct, and then supplies the working fluid to the tip turbine rotor cascade again from the intake side toward the exhaust side of the fan, so as to drive the fan to rotate.

SUMMARY OF THE INVENTION

In the case where a fan driven by a tip turbine is employed in an engine of a VTOL aircraft or the like in the technique mentioned above, however, when a strong wind blows laterally with respect to a thrust of the fan, a large negative pressure may occur on the intake side of the fan, thereby generating a large external force on the intake side of the fan. Thus generated external force may make it difficult to control the flight of the VTOL aircraft.

In view of such circumstances, it is an object of the present invention to provide a fan driven by a tip turbine, which reduces an external force occurring when a strong wind is received laterally to a thrust.

The present invention provides a fan driven by a tip turbine comprising a fan generating a thrust from an intake side to an exhaust side by being driven to rotate; a fan casing for supporting an outer peripheral part of the fan in a rotatable fashion; a tip turbine rotor cascade, provided at the outer peripheral part of the fan and rotatable within the fan casing, for driving the fan to rotate by being supplied with a fluid within the fan casing; and a duct, provided within the fan casing, for supplying the fluid to the tip turbine rotor cascade; wherein the duct supplies the fluid to the tip turbine rotor cascade in a direction opposite from the thrust generated by the fan.

For efficiently supplying a fluid to a fan driven by a tip turbine, it is necessary for a duct to cause the fluid to flow linearly over a certain distance and then supply the fluid to the tip turbine rotor cascade. The structure of the present invention, however, supplies the fluid to the tip turbine rotor cascade in a direction opposite from the thrust generated by the fan, thereby making it unnecessary for the fluid to flow over a long distance on the fan intake side of the duct within the fan casing. This can shorten the length of the fan casing from the rotation surface of the fan to the intake side, thereby reducing an area where an external force is generated by a negative pressure occurring when receiving a strong wind laterally to the thrust. Therefore, the external force occurring when receiving a strong wind laterally to the thrust of the fan can be lowered.

In the present invention, the "direction opposite from" the thrust generated by the fan is not limited to the direction turned around by 180° from the thrust generated by the fan, but may include any direction different from the thrust generated by the fan by at least 90°. In the present invention, the "fluid" is not restricted to gases such as air but may include liquids such as water.

Preferably, the duct supplies the fluid to the tip turbine rotor cascade from the exhaust side toward the intake side in the rotation surface of the fan.

In this structure, the duct supplies the fluid to the tip turbine rotor cascade from the exhaust side toward the intake side in the rotation surface of the fan and thus is not required to cause the fluid to flow linearly from the rotation surface of the fan to the intake side in the fan casing, so that the length of the fan casing from the rotation surface of the fan to the intake side can be made shorter, whereby the external force occurring when laterally receiving a strong wind can be reduced.

In the present invention, the "rotation surface" of the fan refers to a rotation surface formed when a part of the fan which is positioned closest to the intake side rotates.

Preferably, the fan is provided such that the rotation surface is positioned on the intake side of a midpoint of a length of the fan casing along the thrust of the fan.

In this structure, since the fan is provided such that the rotation surface is positioned on the intake side of the midpoint of the length of the fan casing along the thrust of the fan, the length of the fan casing from the rotation surface of the fan to the intake side can be made shorter, whereby the external force occurring when laterally receiving a strong wind can be reduced.

The fan driven by a tip turbine in accordance with the present invention can lower the external force occurring when receiving a strong wind laterally to the thrust of the fan.

DESCRIPTION OF THE PREFERRED EMBODIMENTS

In the following, preferred embodiments of the fan driven by a tip turbine in accordance with the present invention will be explained with reference to the accompanying drawings.

Figure 1:
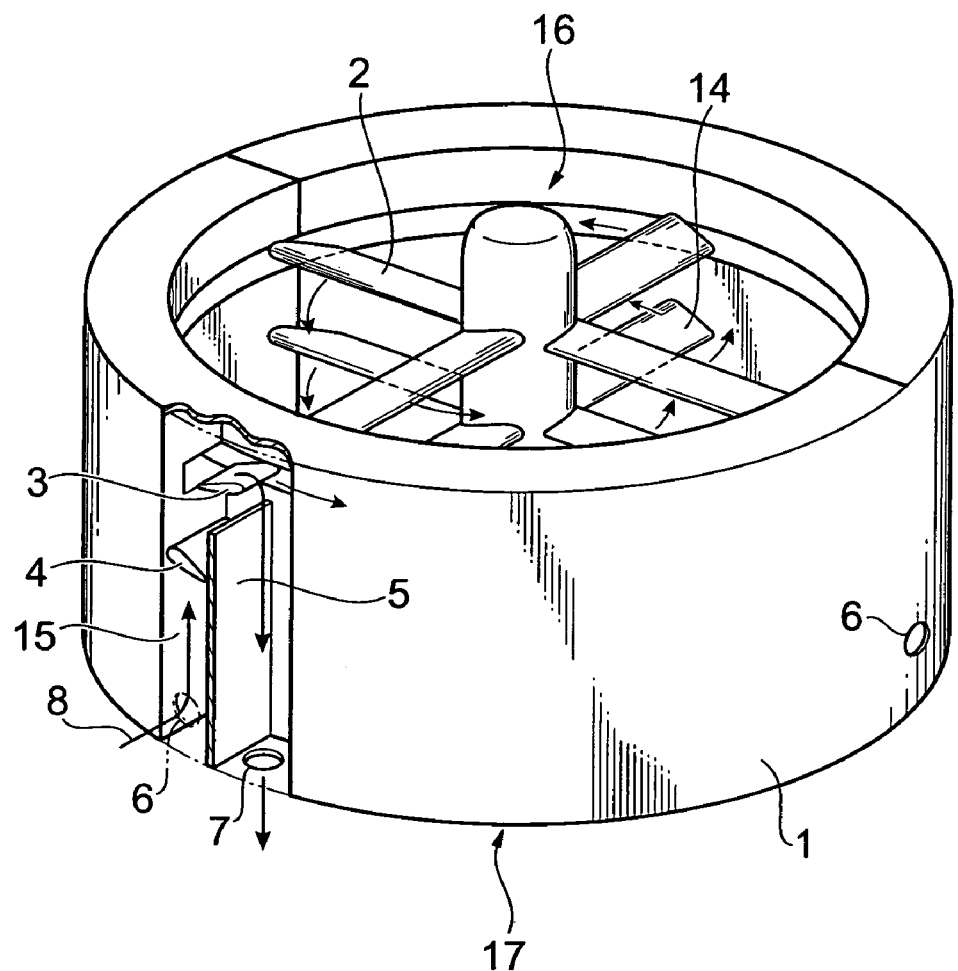
FIG. 1 is a perspective view showing the fan driven by a tip turbine in accordance with a first embodiment.
Figure 2:
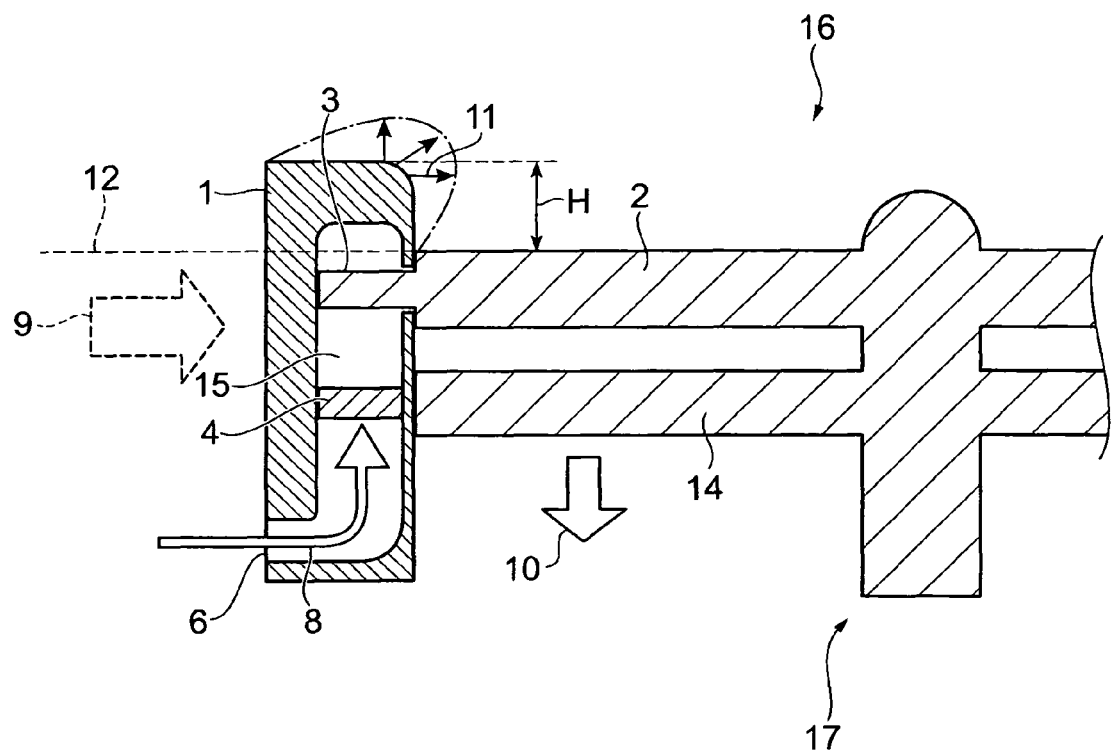
FIG. 2 is a vertical sectional view of the fan driven by a tip turbine in accordance with the first embodiment.

FIG. 1 is a perspective view showing the fan driven by a tip turbine in accordance with the first embodiment, whereas FIG. 2 is a vertical sectional view thereof. The fan driven by a tip turbine in accordance with this embodiment, which is mounted to a VTOL aircraft, is supplied with high-pressure air from a core engine, so as to drive the fan to rotate, thereby generating a thrust. As shown in FIGS. 1 and 2, the fan driven by a tip turbine in accordance with this embodiment is constituted by an upper fan 2 and a lower fan 14 which are driven to rotate coaxially in the same direction, so as to generate a thrust 10 from the intake side 16 to the exhaust side 17, and a fan casing 1 which supports the upper fan 2 and lower fan 14 in a rotatable fashion while surrounding their outer peripheral parts. The rotation surface 12 of the upper fan 2 is provided such as to be positioned on the intake side 16 of the midpoint of the length of the fan casing 1 along the thrust 10.

Ducts (turbine chambers) 15 into which high-pressure air 8 is introduced from the core engine are provided at intervals of 90° in the outer circumferential direction within the fan casing 1. On the other hand, the outer peripheral part of the upper fan 2 is provided with tip turbine rotor vanes 3 integrally molded with the upper fan 2, so as to form a tip turbine rotor cascade. The tip turbine rotor vanes 3, which are supported such as to be rotatable in spaces within the ducts 15, are supplied with the high-pressure air 8 introduced in the ducts 15, so as to drive the upper fan 2 and lower fan 14 to rotate.

At the part closest to the exhaust side 17 in a side face of the fan casing 1, each duct 15 is provided with an inlet 6 for introducing the high-pressure air 8 from the core engine. A stator vane 4 for adjusting the airflow within the duct 15 is provided therein. The stator vane 4 may be integrally molded with the duct 15 or have a structure separated therefrom.

The duct 15 is provided with a separating plate 5 for guiding the high-pressure air 8 having passed the stator vane 4 and tip turbine rotor vane 3 to an outlet 7. The outlet 7 is used for discharging the high-pressure air 8 to the exhaust side 17.

Operations of the fan driven by a tip turbine in accordance with this embodiment will now be explained. When the fan driven by a tip turbine in accordance with this embodiment is operated, the high-pressure air 8 is introduced therein from the core engine through the inlet 6. The high-pressure air 8 fed through the inlet 6 passes the stator vane 4 within the duct 15, thereby adjusting its flow. The high-pressure air 8 having passed the stator vane 4 is supplied to the tip turbine rotor vane 3.

When the high-pressure air 8 is supplied from the exhaust side 17 toward the intake side 16, the tip turbine rotor vane 3 generates a torque necessary for driving the upper fan 2 and lower fan 14 to rotate, thereby driving the upper fan 2 and lower fan 14 to rotate in the same direction. When driven to rotate, the upper fan 2 and lower fan 14 generate the thrust 10 directed from the intake side 16 to the exhaust side 17.

The high-pressure air 8 having passed the tip turbine rotor vane 3 is guided by the separating plate 5 toward the outlet 7. The outlet 7 discharges the high-pressure air 8 toward the outlet 7 side, thereby enhancing the thrust 10.

Figure 4:
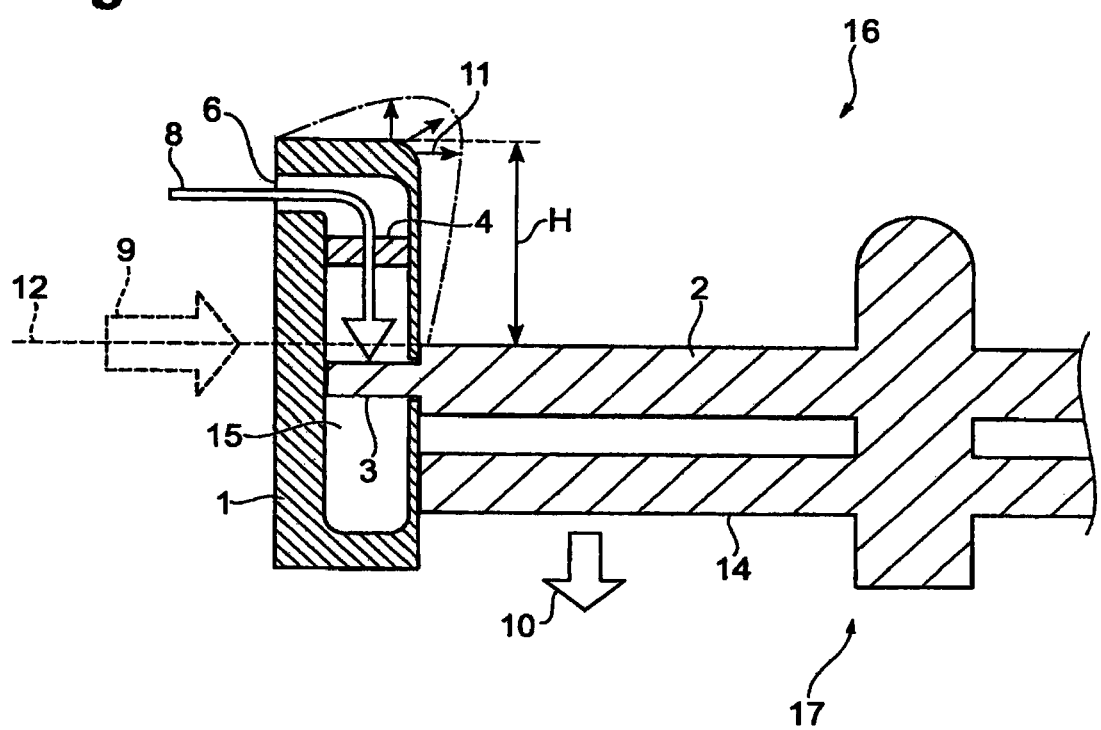
FIG. 4 is a vertical sectional view of a conventional fan driven by a tip turbine.
Figure 5:
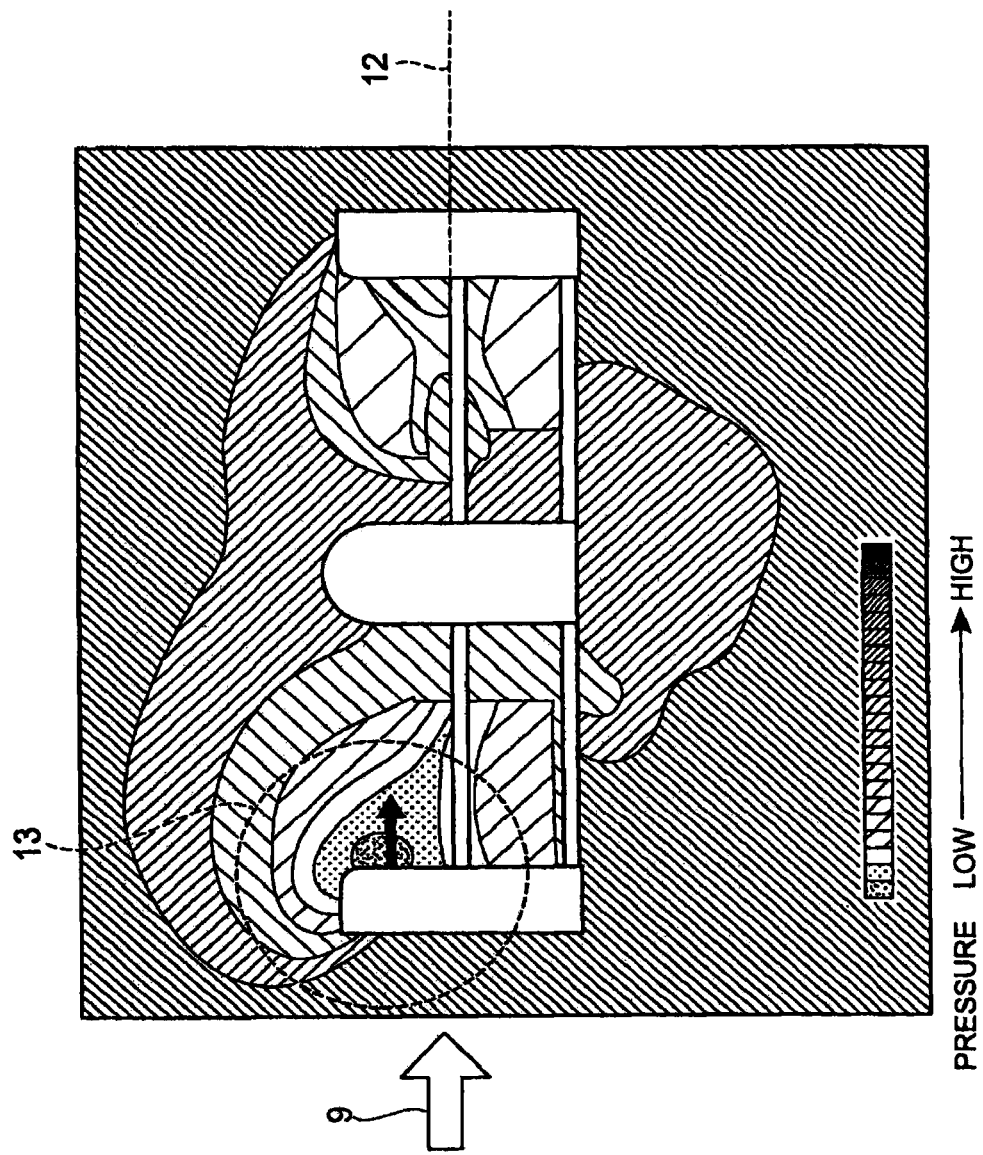
FIG. 5 is a chart showing a pressure distribution in the conventional fan driven by a tip turbine.

In a conventional fan driven by a tip turbine, as shown in FIG. 4, the inlet 6 for the high-pressure air 8 is provided on the intake side 16 of the fan casing 1, so that the tip turbine rotor vane 3 is supplied with the high-pressure air 8 from the intake side 16 toward the exhaust side 17. A certain distance is necessary for the high-pressure air 8 introduced in the duct 15 to adjust its flow with the stator vane 4 so as to be supplied efficiently to the tip turbine rotor vane 3. Therefore, as shown in FIG. 4, the distance H from the rotation surface 12 of the upper fan 2 to the end part of the fan casing 1 on the intake side 16 is long in the conventional fan driven by a tip turbine. In this structure, as shown in FIGS. 4 and 5, there is a large area 13 where a negative pressure occurs when a crosswind 9 is received by the VTOL aircraft during its flight or the like. When a negative pressure is generated, a large external force 11 is applied to the fan casing 1, whereby the conventional fan driven by a tip turbine is less stable at the time of receiving crosswinds.

In the fan driven by a tip turbine in accordance with this embodiment, on the other hand, the inlet 6 for introducing the high-pressure air 8 is provided at the part closest to the exhaust side 17 in a side face of the fan casing 1, so that the tip turbine rotor vane 3 is supplied with the high-pressure air 8 from the exhaust side 17 toward the intake side 16. Therefore, in the fan driven by a tip turbine in accordance with this embodiment, the distance H from the rotation surface 12 of the upper fan 2 to the end part of the fan casing 1 on the intake side 16 can be made shorter, whereby the rotation surface 12 of the upper fan 2 can be positioned on the intake side 16 of the midpoint of the length of the fan casing 1 along the thrust 10.

Figure 3:
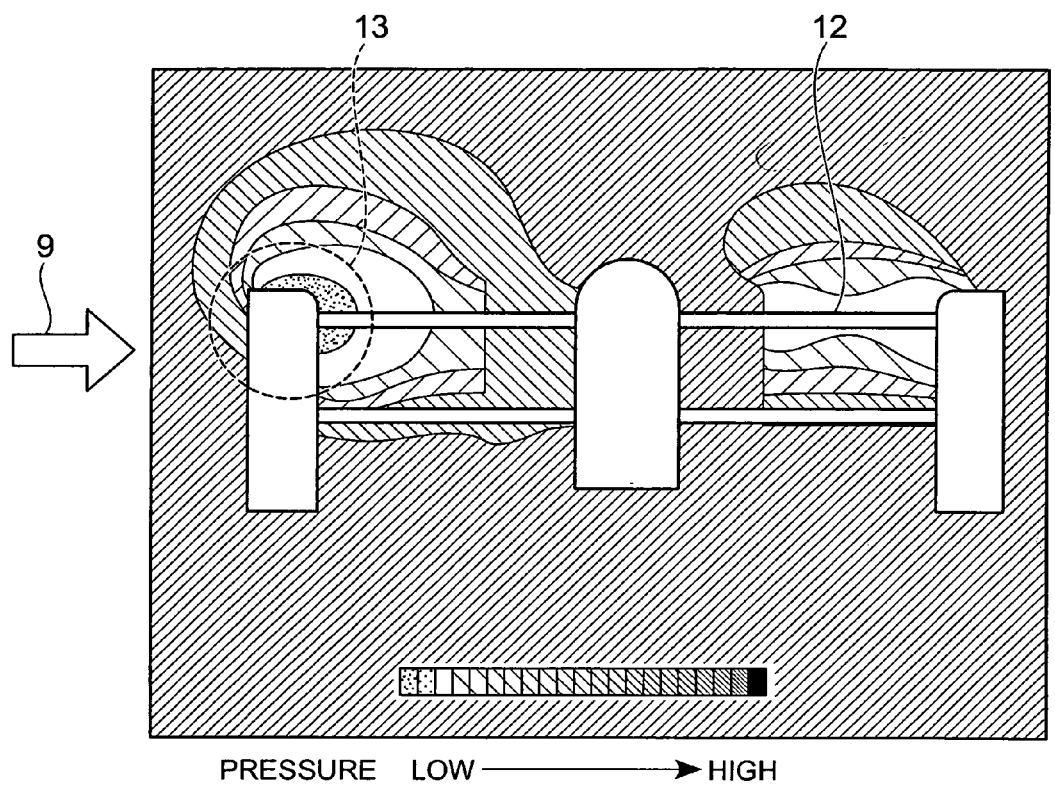
FIG. 3 is a chart showing a pressure distribution in the fan driven by a tip turbine in accordance with the first embodiment.
Figure 6:
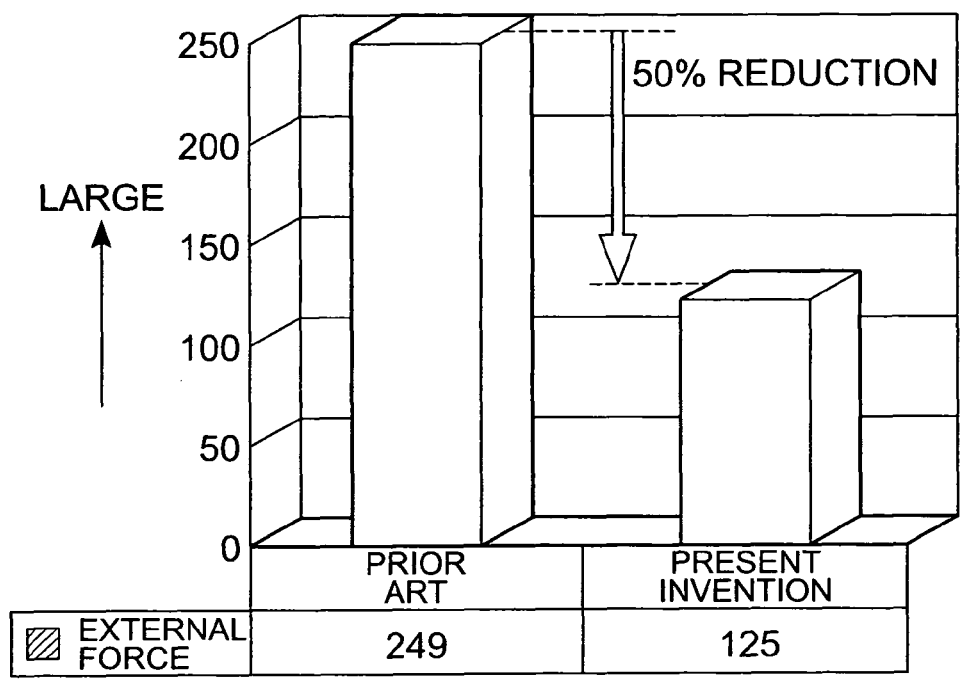
FIG. 6 is a graph showing external forces generated in the fan driven by a tip turbine in accordance with the present invention and the conventional fan driven by a tip turbine.

As a consequence, the fan driven by a tip turbine in accordance with this embodiment can reduce the area 13 where a negative pressure occurs when the VTOL aircraft receives a crosswind 9 during its flight or the like as shown in FIG. 3, so that the external force 11 generated by the negative pressure can be made smaller than the conventional one, whereby the external force caused by the crosswind can be reduced by 50% as shown in FIG. 6. Therefore, even when the VTOL aircraft receives the crosswind 9 during its flight or the like, the fan driven by a tip turbine in accordance with this embodiment can achieve high stability and favorable controllability.

Figure 7:
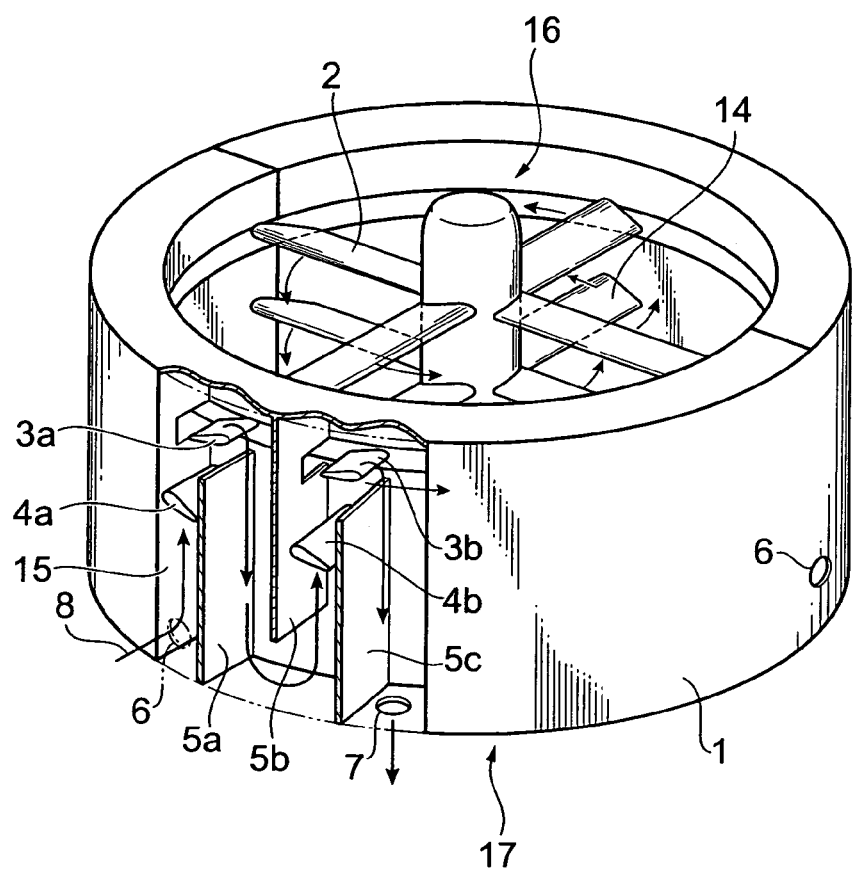
FIG. 7 is a perspective view showing the fan driven by a tip turbine in accordance with a second embodiment.

The second embodiment of the present invention will now be explained. FIG. 7 is a perspective view showing the fan driven by a tip turbine in accordance with the second embodiment. As shown in FIG. 7, this embodiment differs from the above-mentioned first embodiment in that a duct 15 continuously supplying the high-pressure air 8 to both of two tip turbine rotor vanes 3a, 3b is provided.

In this embodiment, the duct 15 is provided with separating plates 5a, 5b, 5c for guiding the high-pressure air 8 having passed a stator vane 4a and the tip turbine rotor vane 3a to a stator vane 4b and the tip turbine rotor vane 3b. The separating plate 5c also functions to guide the high-pressure air 8 having passed the stator vane 4b and tip turbine rotor vane 3b to the outlet 7.

When the fan driven by a tip turbine in accordance with this embodiment is operated, the high-pressure air 8 fed through the inlet 6 passes the stator vane 4a within the duct 15, so as to adjust its flow. The high-pressure air 8 having passed the stator vane 4a is supplied to the tip turbine rotor vane 3a from the exhaust side 17 toward the intake side 16.

The high-pressure air 8 having passed the tip turbine rotor vane 3a is guided toward the stator vane 4b and tip turbine rotor vane 3b by the separating plates 5a, 5b. The separating plates 5a, 5b guide the high-pressure air 8 once from the intake side 16 toward the exhaust side 17 and then from the exhaust side 17 toward the intake side 16 again. The high-pressure air 8 passes the stator vane 4b, so as to adjust its flow. The high-pressure air 8 having passed the stator vane 4b is supplied to the tip turbine rotor vane 3b from the exhaust side 17 toward the intake side 16. Thus, each of the tip turbine rotor vanes 3a, 3b is supplied with the high-pressure air 8 from the exhaust side 17 toward the intake side 16, so as to generate a torque for driving the upper fan 2 and lower fan 14 to rotate.

Since one duct 15 continuously supplies the high-pressure air 8 to two tip turbine rotor vanes 3a, 3b, even when supplying high-pressure air to a number of tip turbine rotor vanes at the same time, this embodiment can unify ducts for supplying the high-pressure air to the tip turbine rotor vanes, thereby simplifying the duct structure.

Figure 8:
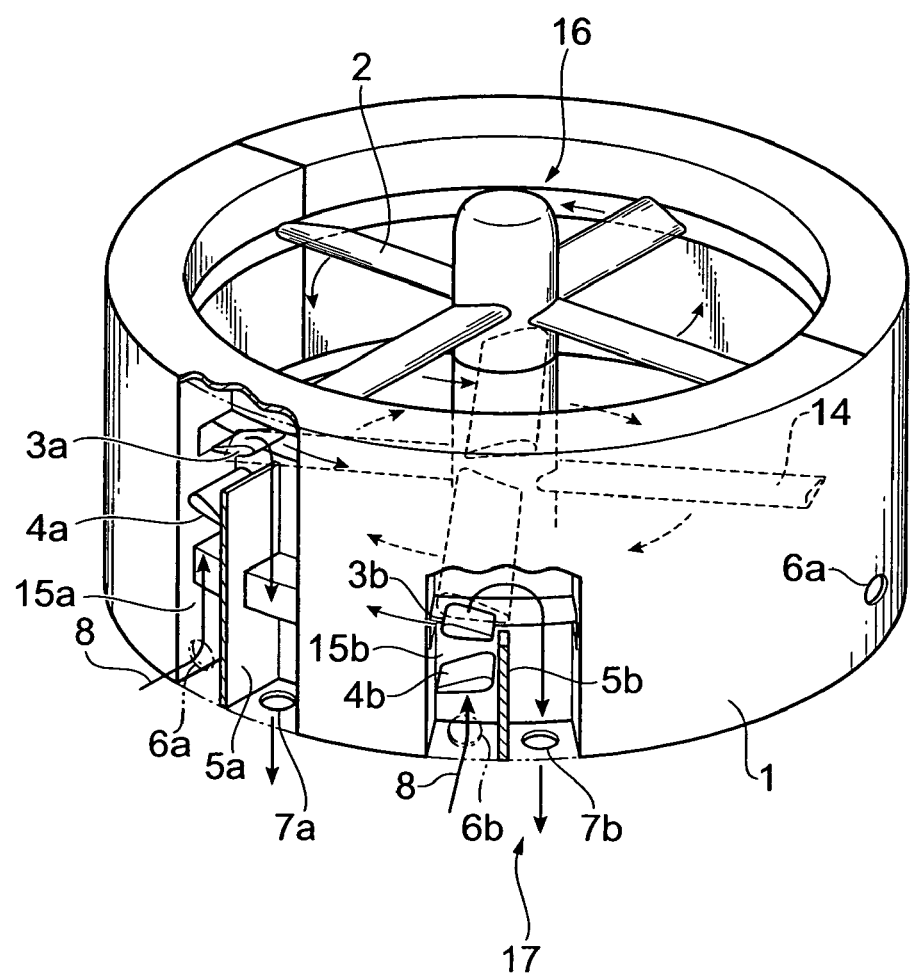
FIG. 8 is a perspective view showing the fan driven by a tip turbine in accordance with a third embodiment.

The third embodiment of the present invention will now be explained. FIG. 8 is a perspective view showing the fan driven by a tip turbine in accordance with the third embodiment. In this embodiment, as shown in FIG. 8, the upper fan 2 and lower fan 14 have their outer peripheral parts supported by the fan casing 1 such that they can be driven to rotate in respective directions different from each other. Within the fan casing 1, a duct 15a for driving the upper fan 2 to rotate is provided with an inlet 6a, a stator vane 4a, a tip turbine rotor vane 3a integrally molded with the upper fan 2, and an outlet 7a as in the first embodiment.

In this embodiment, on the other hand, a duct 15b for driving the lower fan 14 to rotate is separately provided within the fan casing 1. As in the first embodiment, an inlet 6b, a stator vane 4b, a tip turbine rotor vane 3b integrally molded with the lower fan 14, and an outlet 7b are provided within the duct 15b. For driving the lower fan 14 to rotate in the direction opposite from that of the upper fan 2, the stator vane 4b and tip turbine rotor vane 3b are directed opposite from the stator vane 4a and tip turbine rotor vane 3a, respectively.

When operated, the fan driven by a tip turbine in accordance with this embodiment acts like the one in accordance with the first embodiment. However, since the stator vane 4b and tip turbine rotor vane 3b are directed opposite from the stator vane 4a and tip turbine rotor vane 3a, respectively, the upper fan 2 and lower fan 14 are driven to rotate in respective directions opposite from each other.

This embodiment is provided with the respective ducts 15a, 15b, separately from each other, for driving the upper fan 2 and lower fan 14 to rotate, so that the upper fan 2 and lower fan 14 are driven to rotate in the respective directions opposite from each other, whereby the respective torques of the upper fan 2 and lower fan 14 cancel each other out, which can further improve the stability and controllability when employed in VTOL aircrafts and the like.

Though embodiments of the present invention are explained in detail in the foregoing, the present invention can be modified in various ways without being restricted to the above-mentioned embodiments. For example, though the above-mentioned embodiments mainly explain the case where the fan driven by a tip turbine is employed in a VTOL aircraft, the present invention is not limited thereto, whereby the fan driven by a tip turbine in accordance with the present invention can also be employed in thrusters for controlling the driving of automobiles. Also, water may be used instead of air as a fluid supplied to the fan driven by a tip turbine in accordance with the present invention, so as to make it employable as a thruster for controlling the attitude of a submersible.

What is claimed is:

1. A fan assembly driven by a tip turbine comprising:
   a fan generating a thrust from an intake side to an exhaust side of the fan assembly by being driven to rotate;
   a fan casing for supporting an outer peripheral part of the fan in a rotatable fashion;
   a tip turbine rotor cascade, provided at the outer peripheral part of the fan and rotatable within the fan casing, for driving the fan to rotate by being supplied with a fluid within the casing; and
   a duct, provided within the fan casing, for supplying the fluid to the tip turbine rotor cascade;
   wherein the duct includes a duct inlet associated with a side face of the fan casing, the side face being radially outward of the tip turbine rotor cascade; and
   wherein the duct supplies the fluid from the duct inlet to the tip turbine rotor cascade such that the fluid flows in a direction opposite from the thrust generated by the fan when the fluid initially contacts the tip turbine rotor cascade.

2. A fan assembly driven by a tip turbine according to claim 1, wherein the duct supplies the fluid to the tip turbine rotor cascade from the exhaust side toward a rotation surface of the fan and the intake side of the fan assembly.

3. A fan assembly driven by a tip turbine according to claim 2, wherein a length of the fan casing defines a length of the fan assembly along the thrust of the fan and the fan is provided such that the rotation surface is positioned on a side of a midpoint of the length of the fan casing on the intake side of the fan assembly.

* * * * *